(12) United States Patent
Vivadelli et al.

(10) Patent No.: US 7,289,619 B2
(45) Date of Patent: Oct. 30, 2007

(54) SYSTEM AND METHOD FOR MANAGING WORKPLACE REAL ESTATE AND OTHER RESOURCES

(75) Inventors: John H. Vivadelli, Richmond, VA (US); Brian B. Collier, Midlothian, VA (US)

(73) Assignee: Agilquest Corporation, Richmond, VA (US)

( * ) Notice: Subject to any disclaimer, the term of this patent is extended or adjusted under 35 U.S.C. 154(b) by 17 days.

(21) Appl. No.: 10/489,160

(22) PCT Filed: Jan. 9, 2003

(86) PCT No.: PCT/US03/00556

§ 371 (c)(1),
(2), (4) Date: Mar. 8, 2004

(87) PCT Pub. No.: WO03/060798

PCT Pub. Date: Jul. 24, 2003

(65) Prior Publication Data

US 2004/0267623 A1   Dec. 30, 2004

Related U.S. Application Data

(60) Provisional application No. 60/346,880, filed on Jan. 9, 2002, provisional application No. 60/346,950, filed on Jan. 9, 2002.

(51) Int. Cl.
*H04M 3/42* (2006.01)
(52) U.S. Cl. .............................. 379/212.01; 379/88.22; 705/1

(58) Field of Classification Search ................ 705/1; 379/88.22, 212.01
See application file for complete search history.

(56) References Cited

U.S. PATENT DOCUMENTS

| | | | | |
|---|---|---|---|---|
| 4,899,373 | A | * 2/1990 | Lee et al. | 379/201.05 |
| 5,561,709 | A | 10/1996 | Remillard | 379/93.19 |
| 5,802,160 | A | * 9/1998 | Kugell et al. | 379/211.04 |
| 5,848,231 | A | * 12/1998 | Teitelbaum et al. | 726/4 |
| 5,889,845 | A | * 3/1999 | Staples et al. | 379/211.02 |
| 5,978,450 | A | * 11/1999 | McAllister et al. | 379/88.02 |
| 5,990,885 | A | 11/1999 | Gopinath | 715/716 |
| 6,067,456 | A | * 5/2000 | Duran | 455/461 |
| 6,079,863 | A | 6/2000 | Furukawa et al. | 705/5 |
| 6,167,119 | A | * 12/2000 | Bartholomew et al. | 379/88.04 |
| 6,308,160 | B1 | 10/2001 | Rex | 705/6 |
| 6,324,517 | B1 | 11/2001 | Bingham et al. | 705/8 |
| 6,661,785 | B1 | * 12/2003 | Zhang et al. | 370/352 |
| 6,950,508 | B1 | * 9/2005 | Griffiths | 379/201.01 |
| 2002/0065635 | A1 | 5/2002 | Lei et al. | 703/1 |
| 2002/0161590 | A1 | 10/2002 | Sakakibara et al. | 705/1 |

OTHER PUBLICATIONS

Danielle Wood, "Customized Comfort. (the hotel room of the future) (Industry Overview) (Statistical Data Included)", www.findarticles.com, Dec. 27, 1999.

* cited by examiner

*Primary Examiner*—Quynh H. Nguyen
(74) *Attorney, Agent, or Firm*—Williams Mullen, P.C.; Thomas F. Bergert

(57) ABSTRACT

Organizations can proactively manage and reserve shared resources, such as workspaces, equipment and services, as well as report on the utilization of those resources across departments and facilities using the system of the present invention. Work-place management tools as provided by the present invention can be used to manipulate resources in real-time, automate inefficient processes, and track and analyze usage patterns, in order to make wise short-and long-term space and resource decisions.

10 Claims, 15 Drawing Sheets

| Conference room | Cubicle | Team room |
|---|---|---|
| • capacity<br>• facility<br>• floor<br>• can be wait listed<br>• cancellation lead time<br>• in room DVD<br>• in room television<br>• in room projector<br>• in room VCR<br>• number of network connections<br>• number of voice connections | • capacity<br>• facility<br>• floor<br>• can be wait listed<br>• number of network connections<br>• number of voice connections | • capacity<br>• facility<br>• floor<br>• can be wait listed<br>• cancellation lead time<br>• in room projector<br>• in room VCR<br>• number of network connections<br>• number of voice connections |

121

SYSTEM AND METHOD FOR MANAGING WORKPLACE REAL ESTATE AND OTHER RESOURCES

CROSS-REFERENCE TO RELATED APPLICATIONS

This application claims the benefit of U.S. provisional applications Ser. Nos. 60/346,880 entitled "Mobile Officing Reservation System and Method" and 60/346,950, entitled "Communications Interface for Mobile Officing Reservation System", both filed Jan. 9, 2002, and both of common assignee herewith.

TECHNICAL FIELD

The present invention relates to shared resource management, and more particularly to a comprehensive method and system for managing workplace real estate and resources so as to assist businesses in maximizing utilization and productivity.

BACKGROUND ART

Modern corporations require many types of assets in order to function profitably. Depending on the business the corporation is in, the company may need raw materials, storage facilities, equipment, commercial real estate, information processing capabilities, communications systems and, of course, personnel. Since many assets or resources are not used at all times, they may be available for multiple users or for individual users for specific periods of time. It is important for companies to control the management of such shared resources in order to ensure proper utilization and justify continuing investment in the resources.

With the increasing need to accommodate worker mobility, managing and allocating shared corporate resources has become even more important. By ensuring that employees get the resources they need, wherever they are, and that real estate is used efficiently, companies can increase productivity and profitability.

The earliest mobile officing solutions were completely full-service initiatives run by concierges who managed reservations and set up workspaces for daily use. More recently, systems for managing and distributing resources among employees have relied upon paper-based spreadsheets, log books or e-mail calendaring. These approaches fall short in several areas, not the least of which is their inability to manage resources across the enterprise or provide Internet access to a geographically dispersed workforce. It is clear that a new technology infrastructure is required.

SUMMARY OF THE INVENTION

By the present invention, organizations can proactively manage and reserve shared resources (such as workspaces, equipment and services), as well as report on the utilization of those resources across departments and facilities. Workplace management tools can be used to manipulate resources in real-time, automate inefficient processes, and track and analyze usage patterns, in order to make wise short-and long-term space and resource decisions.

The present invention provides a system to allow businesses to improve inefficient resource distribution methods while providing a facility and/or enterprise-wide view of shared assets. Users of the system benefit from automated, easy-to-use services—deployed at either a single facility or across an enterprise—that can be accessed through a common interface, regardless of location. The present invention includes a resource management tool for creating, storing and accessing information about resources, such as real estate, computers, catering services and the like. The present invention also includes a user management tool for creating, storing and accessing information about users, such as user-defined roles, resource manipulation privileges, profile information and the like. The present invention further includes a transaction management component to allow users to manipulate the resources, including affecting reservations for resources, associations of one resource with another, or allocations of resources to one or more users in a subset of users. The present invention can also provide a billing component to be sure that any costs associated with resources are appropriately managed.

Using the present invention, workers can make a reservation through a web site, walk-up kiosk or concierge. The invention can further switch users' unique telephone extensions from the voice communications system to the appropriate workspace, and can then disconnect that extension once the user leaves.

The present invention thereby enables organizations to maximize return on real estate and resource investments, optimize the efficiency of workspaces, automate the reservation and scheduling of workspaces, equipment and services, optimize tele-work and mobile work strategies, deploy a single solution across an entire enterprise, and report on space utilization and plan for future needs.

BRIEF DESCRIPTION OF THE DRAWINGS

FIG. 3 is a chart showing different workspace resource attribute types in connection with one embodiment of the present invention.

MODES FOR CARRYING OUT THE INVENTION

Definitions

Figure 1:
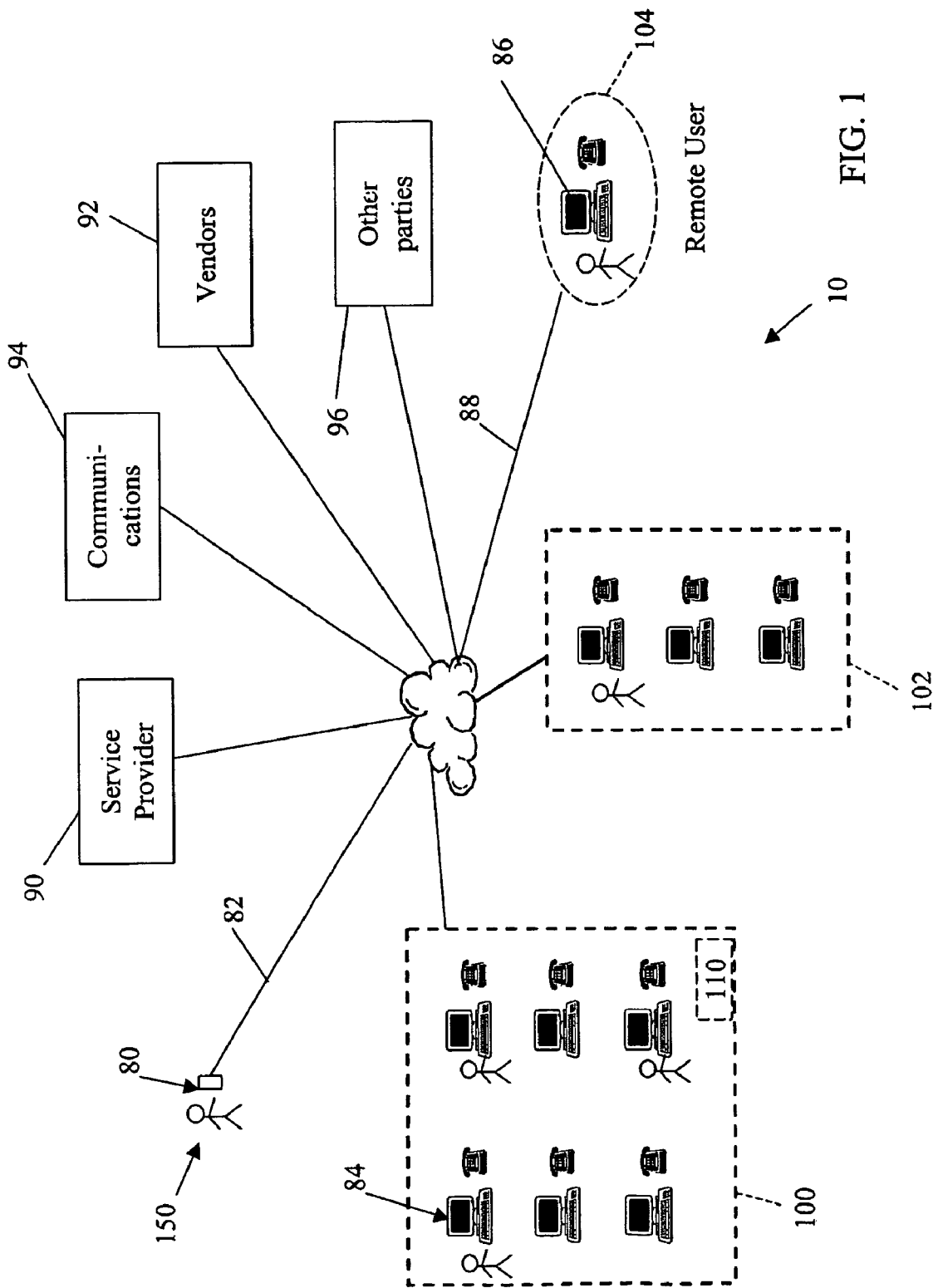
FIG. 1 is a diagram showing multiple actors interacting in a network incorporating the system of the present invention.

The following terms are defined to enhance the understanding of the invention, but the definitions contained should not be read in a limiting sense.

Administrator—a user who has the ability to configure and manipulate the system. This user can manage users, permissions and resources.

Allocation Group—a collection of specific instances of resources, which are then assigned as a descriptor of a user of the system. The allocation group to which a user belongs determines the specific resources which a user can see/request.

Archive—deactivation (not deletion) of users and/or resources from the system.

Attribute—a value associated with a resource or user. Each attribute can be assigned a value.

Authentication—a system verification of the user's ability to utilize the system.

Authorization Rules—rules that determine the type and scope of system functionality to which individual users have access.

Auto Bump—occurs when the system automatically cancels a reservation because the grace period for check in has passed.

Automated Check out—occurs when system checks a user out of his or her reservation at the reservation end time instead of requiring manual check out.

Availability—the state of a resource when it is ready for use, not previously reserved, for a specific period of time.

Barcode—a scan-able image which can be used for authentication during login, check in, or check out.

Bump—cancellation of a reservation by a user having higher authority.

Campus—refers to a number of buildings that are in close geographical proximity. A user can check into a resource that is in a different building using a kiosk, as long as they are within the same campus.

Cancellation—nullification of a future reservation or request.

Cancellation lead time—the amount of time prior to the beginning of a reservation that a change or cancellation can be made to the reservation without penalty.

Capacity—the maximum amount of people that can be accommodated in a given space.

Catering—the provision of food and beverage service.

Check In—confirms to the system that the user has arrived to take possession of his or her real estate reservation.

Check Out—confirms to the system that the user has released possession of a resource.

Concierge—a staff member/user, who assists other users in the reservation process. This can include but is not limited to the making, editing, wait listing, bumping, confirming and canceling of reservations and requests. This also may include the coordination of services, catering and required personnel.

Controlling Transaction—a controlling transaction is always a transaction for a workspace of any type (e.g., conference room, cubicle, etc.). Controlling transactions can have other transactions associated with them (dependent transactions). The success or failure of the controlling transaction determines the success or failure of its dependent transactions.

Dependent request—a dependent request is another unconfirmed transaction by a user, which is associated with an unconfirmed resource request.

Dependent Transaction—a transaction associated with a reservation for resource.

E-mail notification—an e-mail that is generated upon the confirmation of a reservation, receipt of a request, or notification of cancellation or bump, for example.

Equipment—resources available for reservation, such as projectors, laptops, or whiteboards, for example.

Event—a group of reservations that are tied together.

Facility—the physical building that houses real estate managed by the present system.

Grace period—the maximum time allotted from the start time of a reservation to the time when a reservation will be automatically bumped by the system.

Guest extension period—defines the "free or unassigned" extra extensions available on a company's specific PBX. These extensions can be temporarily assigned to people for the duration of their working in the facility.

Hoteling—sharing of office workspaces and resources.

Kiosk Interface—a browser-based interface specifically designed to allow users to interact with the system via touch screen operation (functions controlled with finger tips) on a computer equipped with a touch screen monitor computer that enables users to operate the system. The Kiosk Interface is capable of integrating with authentication devices or programs such as barcode scanner, magnetic card reader, etc.

Lead Time—the amount of up-front notice required by the system before a request for resource is allowed to take place. For instance, a request for catering may require a 24-hour advance request.

Login information—information required by the system to begin a session.

Manual Approval—the act of manually consummating a reservation or order to make the resource unavailable for other users and making it a confirmed reservation for the requestor.

Mobile worker—a person who works in many places.

One-click reservation—The ability to predefine a set of required criteria for a user's most frequently created reservation.

Permission—an authorization or approval to manipulate transactions within the system of the present invention, usually provided by the Administrator of the system.

Pooled Resource—a resource not uniquely named or accessible by a request agent. They can be shared pieces of equipment that are classified as something that must be delivered to a place specified by a request agent. For example, "computer" might be a representation of an unnamed or pooled resource.

Preference—user-established values that enable one-click reservations, best-fit alternative selections and other system functions.

Profile—a collection of user information.

Race condition—occurs when two or more users simultaneously access and try to request the same resource.

Request—an unconfirmed transaction in which a user has asked for a particular resource.

Reservation—the temporary assigning of a resource to a user requesting the resource for a scheduled period of time.

Resource—an asset or service that is managed by the present system.

Resource category/Resource type—the general and specific examples of resources. For example, a workspace is a category and a cubicle is a workspace type.

Search Criteria—data upon which a search is performed.

Services—work or duties performed in association with the fulfillment of a reservation/request.

Time block—This described the range of time between the start time and end time of a user's request for a resource.

Time slot—This describes the interval of time that is used to segment requests and reservations at a more granular level. For instance, a reservation for 1 p.m.-2 p.m. may actually consist of four fifteen-minute time slots.

Voice Communication System—a telephony switching device that allows phone extensions to be assigned to a physical location, such as PBX (Private Branch Exchange), Voice over Internet Protocol ("VOIP"), etc.

Waitlist—a mechanism for allowing users who have requested unavailable resources to be placed on a priority list for reserving the resource, should it later become available.

Workspace—a reservable space resource.

System Components and Operation

As shown in FIGS. 1 through 17, there is provided a system 10 for managing workplace real estate and resources. In FIG. 1, a single business is shown which may extend across multiple offices 100, 102 to remote users 104 (accessing, e.g., from their homes) and users 150 who may need to access the corporate network via wireless device, for example. The network can be any of a variety of hardware, software and communications technology designed to facilitate corporate information processing. In one embodiment, the main server farm 110 is located at office 100, and can include typical office suite software, internal and external (e.g., Internet) network access capabilities, security, corporate web server, transaction server, e-mail server, as well as an application server for assisting in the execution of the present invention.

Figure 2:
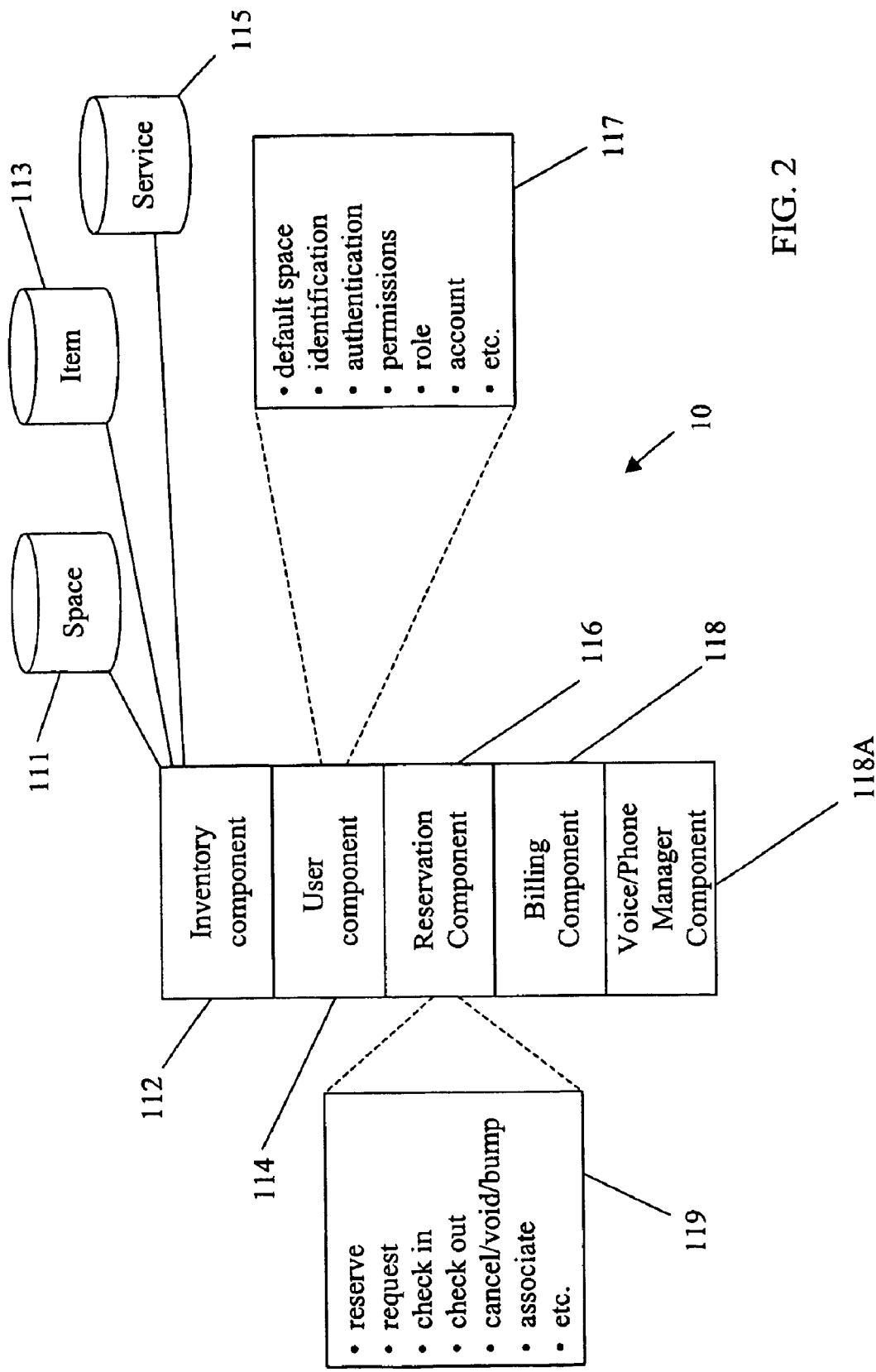
FIG. 2 is a diagram showing various components used in connection with one embodiment of the system of the present invention.

As shown in FIG. 2, the system 10 of the present invention includes an inventory component 112, a user component 114, a reservation component 116 and a billing component 118. The inventory component can store and access information about every reservable resource, whether that resource is (1) physical workspace 111, such as a cubicle, conference room or training room; (2) a physical item 113, such as food and beverage, computer, telephone, writing implements; or (3) services 115, such as catering, photocopying, or courier services, or network or voice connectivity. Within the inventory component, the present invention can store default information related to each employee or worker. For example, if office 100 has 75 workspaces and 70 employees, the inventory component can store information about each employee and his or her respective primary or default work space. In this way, the present invention can know what workspaces will not be available for reservation by default, i.e., with no worker movement. In one embodiment of the invention, users are not provided with any default workspace, but may have priority or exclusive rights to reserve their workspace on a regular basis.

The inventory component 112 can also store information about each work space type, such as the various types of resources that are available based upon the type of workspace being reserved. As shown in the diagram 120 in FIG. 3, for example, a DVD player may be available in a conference room as at 121, but not at a cubicle. Also, the inventory component can store information related to costs for using each resource, whether costs are always assessed, and when to invoke late cancellation charges.

The user component 114 stores information 117 about each user, including the user's role, identification, authentication credentials, permission information, and other user-specific elements. The user's role may be one of the following roles: administrator, concierge, user, service provider, or equipment provider. The user's identification can be the user's name or employee number. The user's authentication credentials can be a password, private key, or biometric identification. The user's permission information can determine what the user can access, and may be determined on a default basis by the user's role, or may be customized based on the user's needs. The user's permission information can also include information about specific associations or groups to which the user belongs and which allow the user to make special reservations as will be described below. Other user-specific information can include physical item requirements for the user at his or her workspace, computer and telephone preferences and other preference information (e.g., window office, near kitchen, indirect light). In one embodiment, the user component includes previously stored information describing the user's preferred parameters for a reservation including facility, workspace type, specific resource or resource type, day or date, time and recurrence, for example.

The billing component 118 stores information related to billing. This can include charges incurred by users of various workspaces, resources and services.

The reservation component 116 allows users to interact with the inventory component so as to reserve or request resources, check into or out of a reservation, cancel or void a reservation, or conduct other types of transactions as at 119, and as herein described. The reservation component can also be called the transaction engine.

The voice component 118A handles voice communication services and transfers in connection with the present invention as described in more detail hereinafter.

Transaction Management

The system of the present invention includes transaction management capabilities for handling a wide range of activities, including manipulating the items in the inventory. For example, users can check resource availability, create and modify requests for resources, and check into and out of reservations. Users can also allocate resources to specific users or user groups, or associate a specific resource with an already made reservation. Resources can include a variety of items such as conference rooms, cubicles, computers, or catering, for example.

Figure 4:
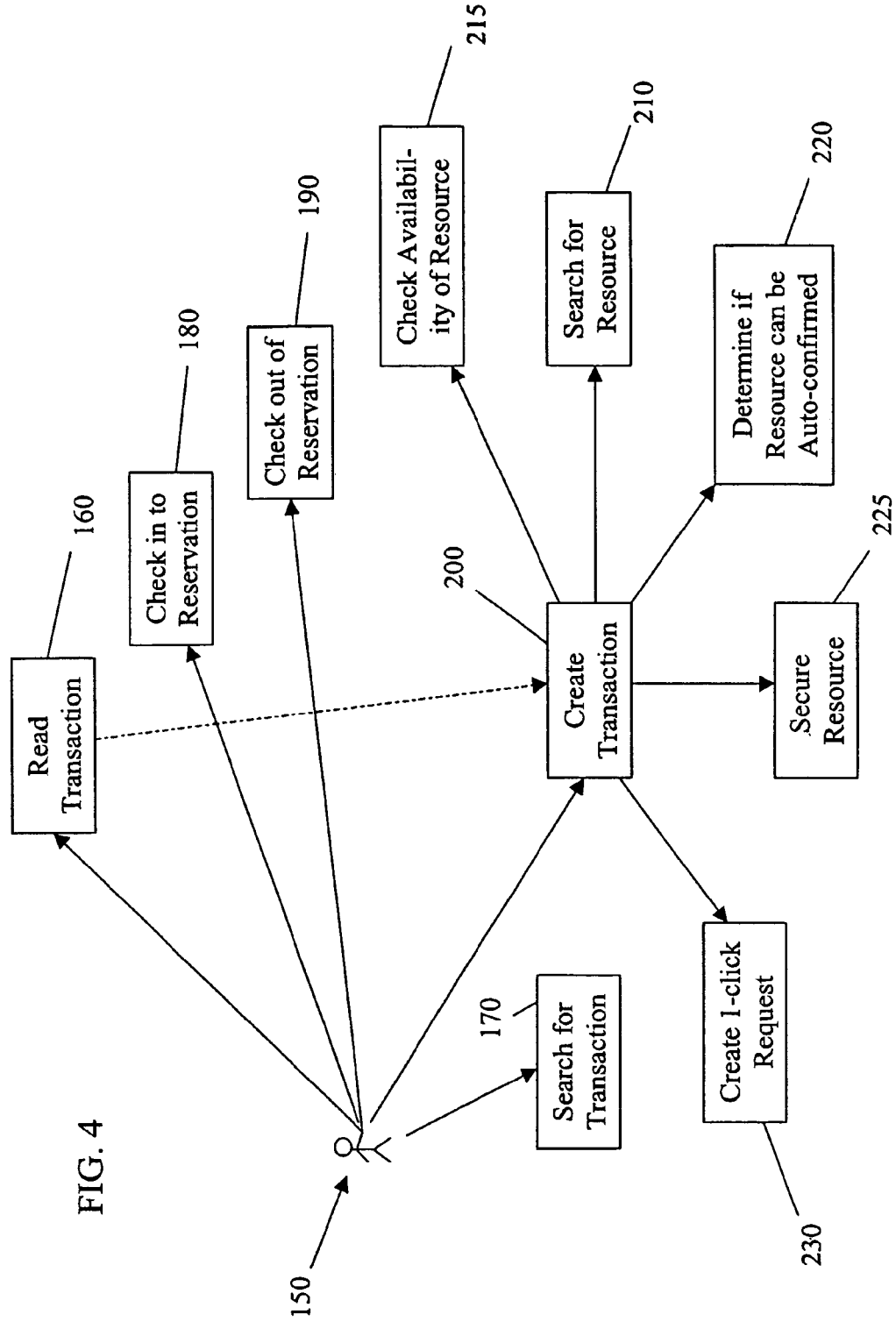
FIG. 4 is a block diagram showing one method in which a user can manage transactions in connection with the present invention.

FIG. 4 shows a graphical representation of some of the user's transaction management capabilities in connection with the present invention. The user 150 can be an administrator, an employee, a concierge or other entity given authority to access the system of the present invention. In one embodiment, the system architecture 22 of the present invention incorporates a web server 23, application server 24, transaction engine 25 and data mart 26, as shown in FIG. 17. In one embodiment of the invention, the user can access the system via the Internet or other network using a web browser 21 at their workspace, mobile device, home or kiosk. The voice communication controller 34 discussed later herein would directly access the application server 24.

At 160 in FIG. 4, the user can read a previously established transaction, whether that transaction is a past or present request, reservation or order. In one embodiment, the user must first be authenticated and authorized before having read capabilities. Authentication can be through any of a variety of commonly known authentication procedures, such as password, key encryption or biometric authentication. Authorization can also be via any of the commonly known authorization techniques, such as the pre-registration of the user into a defined category having particular access authority associated to the class. When searching for a particular transaction, the user can be provided with search parameters, such as type of transaction, originator of the transaction, or dates surrounding the transaction, for example. Once the user specifies the search parameters, the present invention will search for the transactions matching the specified parameters and further being permissible for the user to view, as shown at 170. Upon viewing the returned results, the user can select the transaction to view/read.

As shown at 180 and 190, respectively, the user can also check into or out of a reservation. In these cases, the user can be authenticated and authorized as before, and will have previously established and confirmed a request for workspace. Upon deciding to check in, the present invention presents the user with a listing of outstanding reservations to which the user has not previously checked into or out of Upon selecting the desired reservation, the present invention presents a confirmation to the user, notifies all additional applicable parties, and records appropriate metric information for later system use.

In one embodiment of the present invention, the user can be a mobile worker accessing the system via mobile device having a browser or the like. In another embodiment of the invention, the user can check in via local kiosk. In a further embodiment, the user can check in via calling or otherwise communicating with a system concierge, who may or may not be locally present at the check-in location.

The system of the present invention can accommodate early and late arrivals for scheduled reservations. In one embodiment, user telephone service can be switched immediately upon the user's arrival, but the user's start time for billing purposes would not begin until the reservation time. In a further embodiment, the user's start time for billing purposes would begin at the actual check-in time if the user was checking in unusually early, such as, for example, more than one time slot earlier than the actual reservation time. The invention can be customized to allow business rules to determine when voice communication profiles are transferred or when billing will begin, for example.

Upon checking out of a reservation as at 190, the user is informing the system that he or she is relinquishing possession of a workspace, and similar procedures to the check-in case follow. If the user has extended his or her stay beyond that originally reserved, the system of the present invention will allow this as long as there are no other reservations having priority over the reserved space or facilities/resources. The system will also track time used for billing purposes, and in one embodiment will not re-transfer phone systems back until the user has checked out.

As shown at 200, the user can create a transaction for the purposes of researching or requesting reservation of resources. The user can be prompted with questions which help the system pinpoint the type of resource the user is seeking. The system can then search for the desired resource, as at 210. Upon finding the desired resource, the user can query as to the availability 215 of that resource given the user's particular requirements. If the resource is available, the user can inquire as to whether the resource can be confirmed without requiring additional human approval, as at 220. If so, the resource is then reserved for the given location, time and date specified by the user. The system then blocks that resource's availability from other inquiring users for the specified time and date, and can send a confirmation to the user as well as notification to other appropriate parties, as at 225. If the resource requires additional human approval, such as the administrator or a department head, for example, such person(s) would be notified as determined by the system and, upon their approval, the above reservation procedures would occur. In one embodiment of the invention, if two or more users simultaneously access and try to request the same resource, one or more of the parties may lose the desired resource due to another user making the reservation first. This is known as a race condition; thus, it is important for the user to realize that the resource may or may not still be available until the reservation is confirmed.

In another embodiment, when the transaction is created for a resource other than workspace, the system of the present invention creates an independent transaction, i.e., a transaction not tied to any other resources. Where the transaction is created for a workspace, the user can be given the opportunity to request other resources which will become dependent transactions, i.e., they are related to the workspace transaction, which becomes the controlling transaction. In this way, the user can cancel a given transaction for workspace, and the dependent transactions related thereto will become automatically canceled.

As shown at 215, the user can check the availability of resources by answering a series of questions about the resource desired, including, for example, the frequency of their request (e.g., daily, weekly, monthly). The questions presented can follow a pyramidal approach, such as by having the user define the resource category first, then the resource type within the selected category, and the date/time/location information to meet the user's needs. In one embodiment, the questions are presented within a user interface that can be simply manipulated for limited input environments, such as mobile phones. For example, the interface may include simple selection buttons corresponding to numbers on the user's phone, as opposed to text entry boxes. In another embodiment of the invention, the information returned by the system can include the closest matches for the request, if there are no direct matches.

In one embodiment, as at 230, the user can pre-store information in the system corresponding to the user's most commonly requested reservation. Upon storing this information, the user can then direct a "one-click" transaction search and request. In one embodiment, the user's one-click preference information includes day of week, start time, end time, facility, neighborhood and resource.

At all times, deviations from common system functions are accounted for. For example, if there are no reservations pending for a user, the system can so notify the user upon the user desiring to check in.

Figure 5:
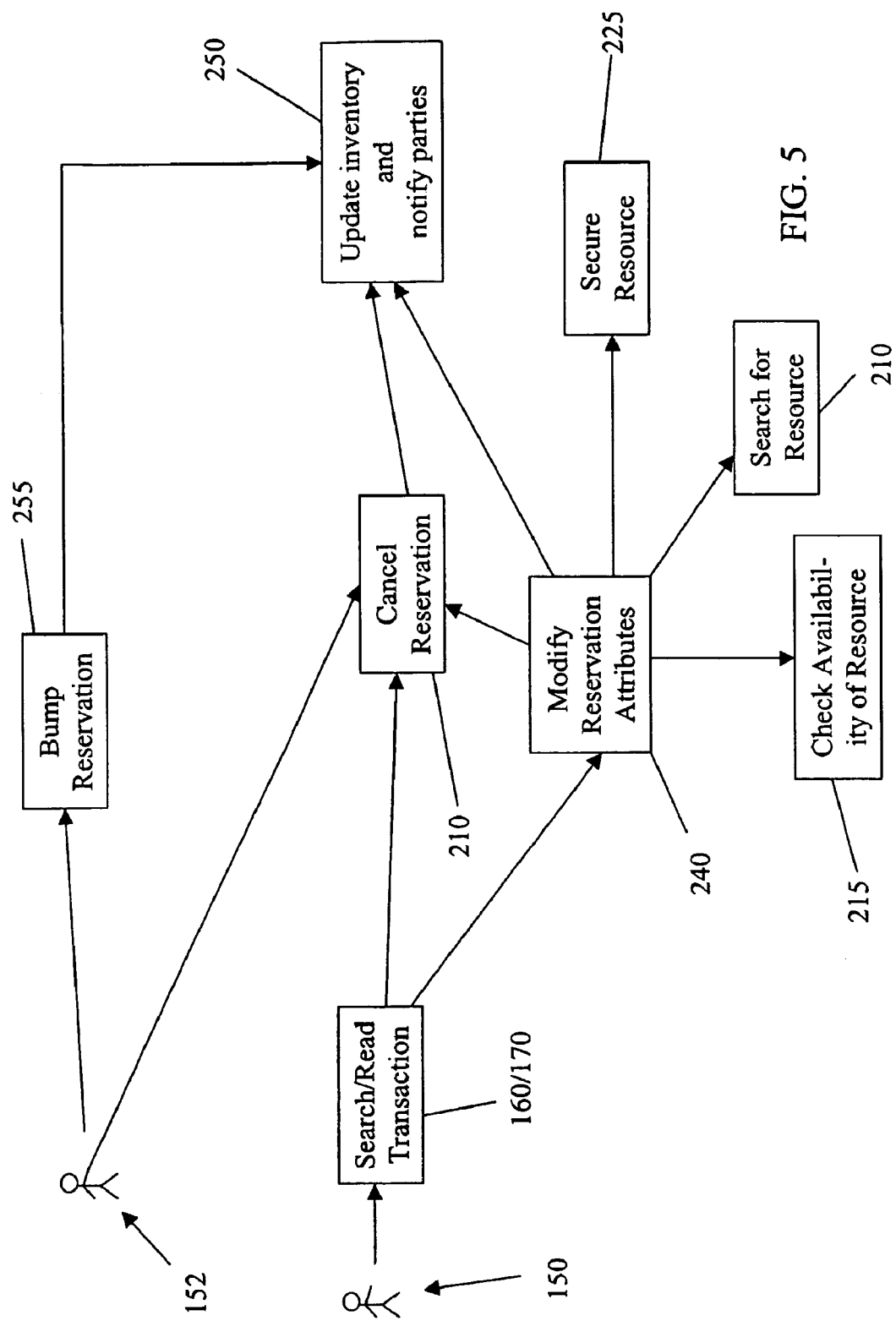
FIG. 5 is a block diagram showing one method in which a user can update reservations in connection with the present invention.

As shown in FIG. 5, users can update existing reservations and/or orders. These types of functions can include altering the time or location of a reservation or an order. Further, the altering of a controlling transaction (e.g., a workspace reservation) can affect the dependent transactions related thereto. In one embodiment of the invention, users are prevented from changing reservations where they have already checked into the reservation or where the start time has already passed.

A user 150 indicating to the system that he or she wants to modify an existing reservation 240 or order can be provided with a menu of current reservations. Upon selecting the particular reservation of interest, the modifiable parameters associated with the reservation are presented. Once the user has changed the desired parameters, the system invokes the functionality provided by the "search for resource" function 210 to ensure that the user's requested changes have not affected the resource's availability. Next, the system cancels the user's original reservation as at 245 and makes available to inventory any resources not part of the revised reservation as at 250. Also at 250, the system notifies the inventory of any resources newly restricted by the revised reservation, including dependent transactions. All appropriate parties are notified and confirmations can be sent.

If a conflict results from a desired reservation change, the system can notify the user and request alternative reservations, or the system can take previously stored default decision information related to the user to make the best fit from the options available for resolving the conflict. In one embodiment, the user can be prompted to confirm that the changed reservation will result in one or more dependent transactions being dropped and that this is acceptable. In a further embodiment, the system checks for "best fit" by resource-type and time block. For example, if the resource is a conference room, the system can see if other conference rooms are available.

As further shown in FIG. 5, the system of the present invention can be used to bump 255 or cancel 245 a reservation. Bumping 255 a reservation involves ending another user's confirmed reservation against their wishes. Bumping can occur after the start time of a reservation but before the end time. Bumping is typically initiated by a user 152 having a higher status than the original user, such as one having permission to bump certain levels of reservations. Once the reservation has been bumped, the system notifies all necessary parties, frees all previously reserved resources, and notifies all other necessary systems, such as the voice communications systems. In one embodiment, the system of the present invention can be programmed to automatically bump reservations based on defined circumstances (e.g., check-in has not occurred within 30 minutes of start time).

Canceling 245 ends a reservation and can be performed by the originating user 150 or user 152. Canceling can be configured to occur prior to the start time or during the reservation. In one embodiment, the system can allow a concierge or other agent for the user to cancel the reservation. Such instances may require that the agent use a special code or password to effectuate the cancellation. In a further embodiment, the system can be programmed to require lead time in order to end the transaction and therefore release the canceling user from financial responsibility for the reservation.

Figure 6:
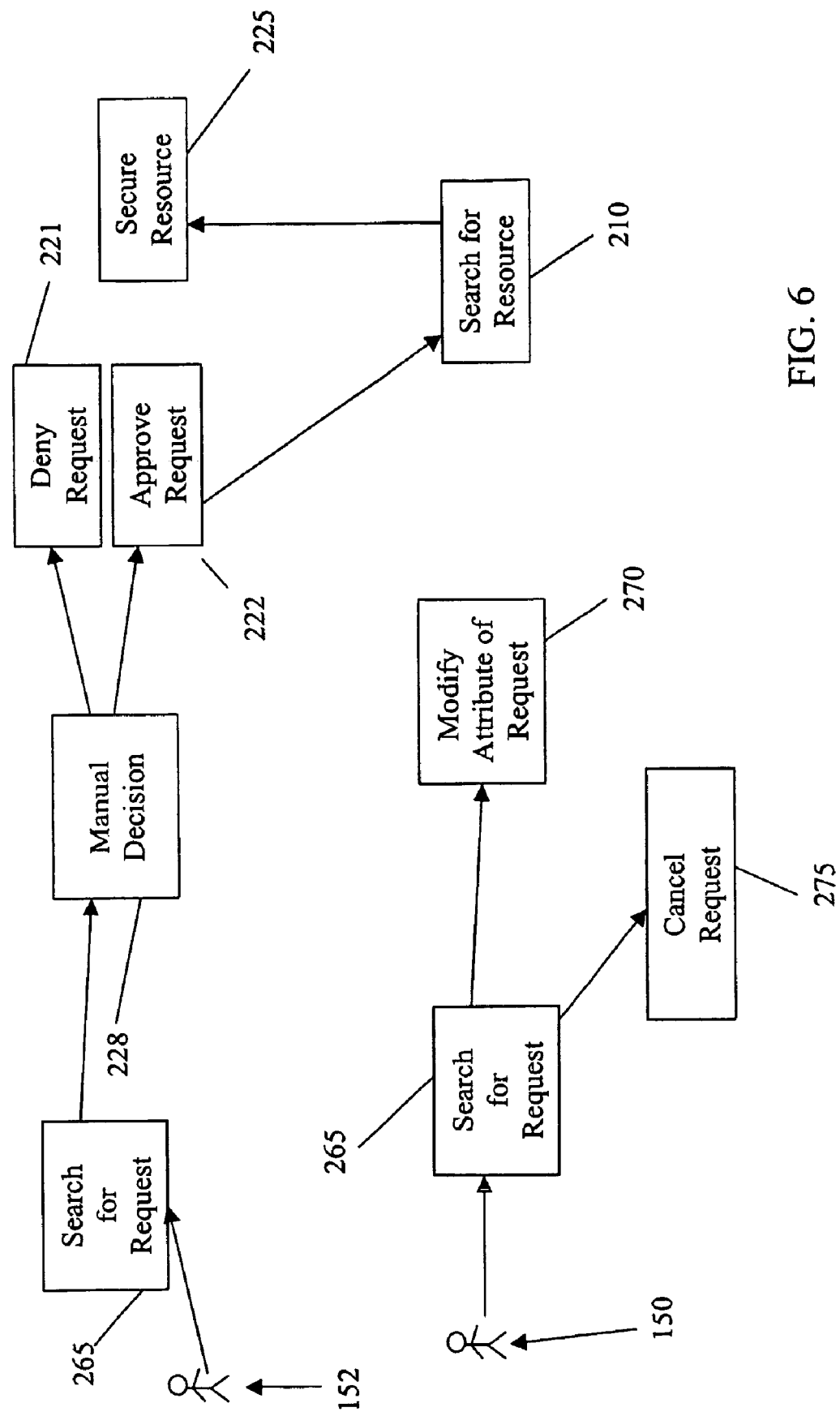
FIG. 6 is a block diagram showing one method in which a user can update requests in connection with the present invention.

As further shown in FIG. 6, the system can allow the user 150 to modify an existing request which has yet to be confirmed as a reservation by the system. In such a case, the user can request at 265 a listing of current requests and can select the particular request desired to be modified. Once selected, the user is provided with the parameters which can be modified, and the user makes the desired changes, as at 270. The system accepts the desired changes, and the user's original request can then be canceled as at 275.

Requests are not immediately confirmed but require authorized user 152 approval. Upon logging in to the system, the user 152 can then select the requests 265 that he or she chooses to make a manual decision 228 and can then approve 221 or deny 222 the request. Upon approval, the system determines availability 210 for the request and if available the system reserves the resource requested. The requestor is then notified and can act accordingly as previously described.

Figure 7:
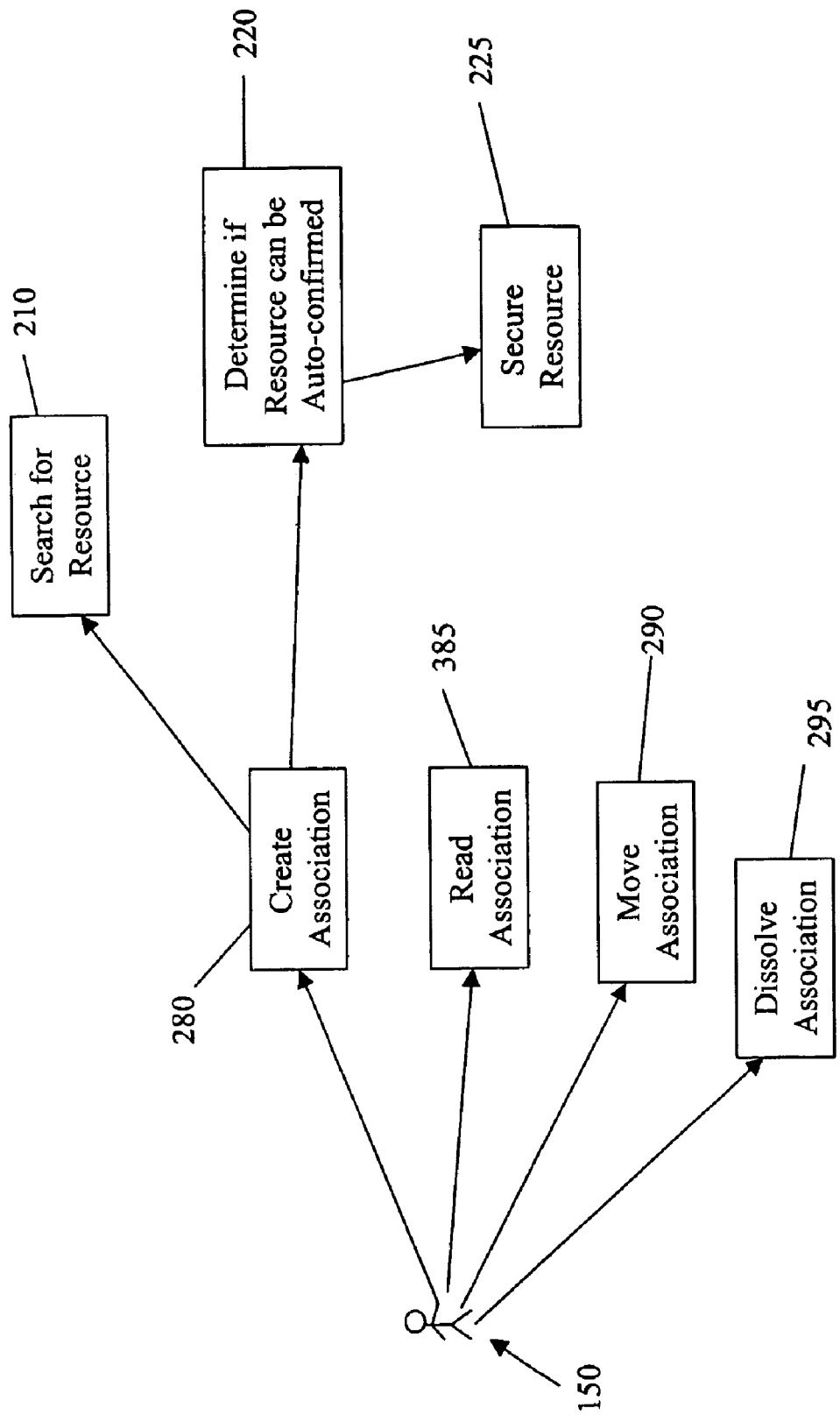
FIG. 7 is a block diagram showing one method in which a user can manage associations in connection with the present invention.

As shown in FIG. 7, associations can also be created, read, moved and dissolved. Dependent transactions can also be removed or added as necessary. For example, in creating an association, as shown at 280, a user may already have one or more reservations pending in the system, and may wish to add a resource to one of the reservations. Upon directing the system, the user can search for resources as at 210 which match his or her needs and, if available and securable, can tie the additional resource to the existing reservation. For example, if a user has requested a workspace but no other resource, the user may wish to search to see if an additional resource is available. If so, that resource can be added to the existing workspace reservation.

Similar to reading a transaction, the user can also select to read an association, as shown at 285, whereby associations of transactions can be listed for the user to select from. Upon making a selection, the user can see all previously created transactions within the selected association.

Similar to changing a reservation or existing transaction, moving an association, shown at 290, allows the user to change a transaction for space (a controlling transaction) and all dependent transactions. In changing the parameters of an association, the corresponding parameters of the individual transactions are also changed. For example, changing the date an association is set to occur will change the start time for all of the transactions grouped within the association. In one embodiment of the invention, the association cannot be moved if the start time has already passed.

Similarly, dissolving an association, shown at 295, allows the user to cancel the entire association by dissolving the primary or controlling transaction. For example, the user may dissolve an association of conference room facilities, network connectivity, video-conferencing and catering over a two-day period by simply canceling the conference room facilities. Once canceled, the remaining dependent transactions are also canceled by the system, and the system inventory is updated to reflect the newly available resources.

Dependent transactions can be added and removed from controlling transactions in a similar fashion. Upon searching for user-related associations, the user may desire to add an additional resource as a dependent transaction from a controlling transaction, e.g., adding a projector to a conference room reservation. The system can search for and confirm the availability of the resource to be added, then notify the appropriate parties and update its inventory to allow for the newly taken resource. Similarly, the user may later remove the projector equipment from the conference room reservation.

It will be appreciated that many of the functionalities invoked by the present system can be re-used for different user needs. For example, the system can use the "Search for Request" and "Cancel Reservation" functionality when the user desires to modify a request. In this way, many portions of the programming involved in the present invention are maximized for use.

User Management

Figure 8:
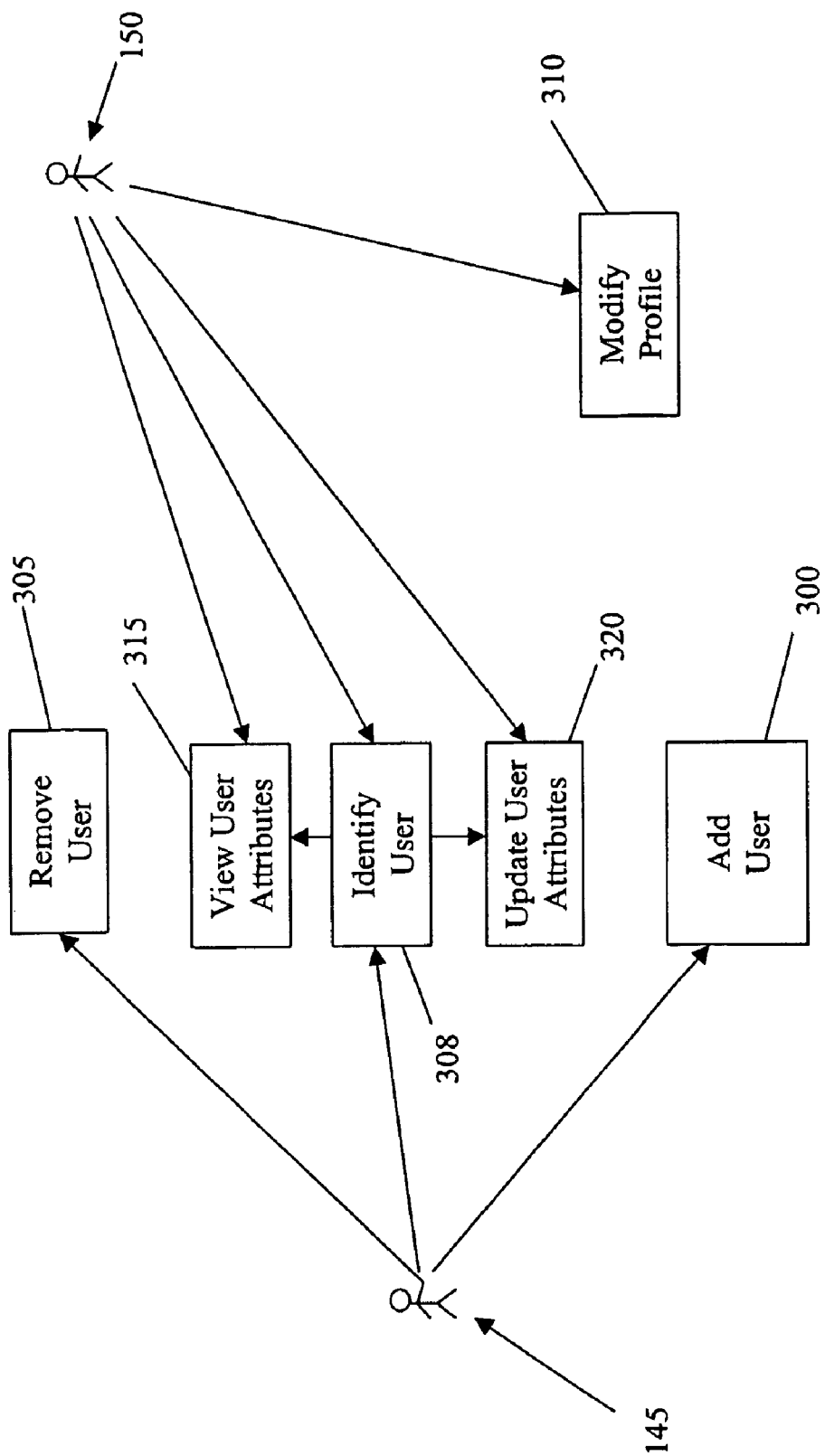
FIG. 8 is a block diagram showing one method in which a user can manage users in connection with the present invention.

As shown in FIG. 8, the system of the present invention allows user and user types to be created and removed. Each user can further be provided with profile information to assist the system in processing user-specific requests. In one embodiment of the invention, the system first designates an administrative entity 145 or entities having rights to create 300, remove 305, identify 308 and modify 310, 320 user information.

In establishing a new user to the system, as shown at 300, the administrator can add user demographic information, profile information, the user's role, the user's allocation group, and other user attributes. The user's role can be, for example, administrator, concierge, mobile worker, knowledge worker, etc. The system can allow the administrator to establish user information based on pre-defined fields and parameters, or based on administrator-defined fields and parameters. The system can also have pre-defined authorization levels based upon the user's status or role. The newly defined user 150 can also review 315, update 320 and approve the information stored in his or her profile. If the information needs to be modified from time to time, the user, administrator or concierge can do so, as at 310. Modifying a profile can include establishing a user's "one-click" preference information for use when creating a transaction.

Users may also use the present invention to search for other users having a given profile, or for the current location of a given user based on existing reservations.

Resource Management

Figure 9:
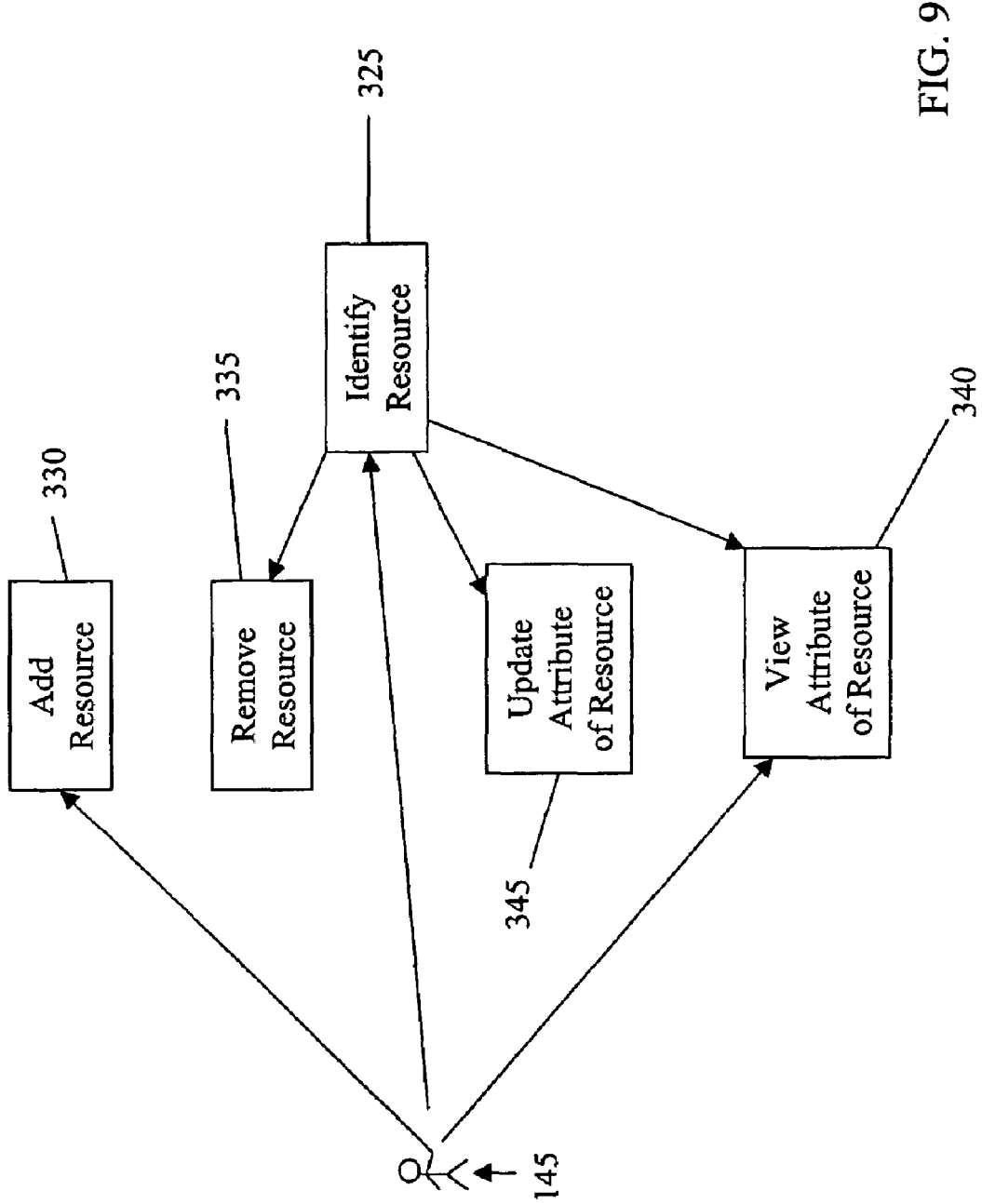
FIG. 9 is a block diagram showing one method in which a user can manage resources in connection with the present invention.

Just as users can be added, removed or modified, resources can be added, viewed, identified, modified and removed, as shown in FIG. 9. Administrators 145 can add resources to 330, or remove resources from 335, the inventory of resources. Resources can be added from a pre-defined list or based on a user's specific needs. Once added, the resource must be given attributes that define its behavior in the system. Attributes can be viewed 340 and updated 345 for existing as well as newly created resources. For example, there may be pre-conditions for the resource's availability, or the resource may not reduce inventory if selected (e.g., writing instruments at a workspace). System reporting can determine usage rates of various resources and associated business procurement needs. If custom user or resource attributes are implemented, the implementing user must specify the data type and format of the new user attribute.

Figure 10:
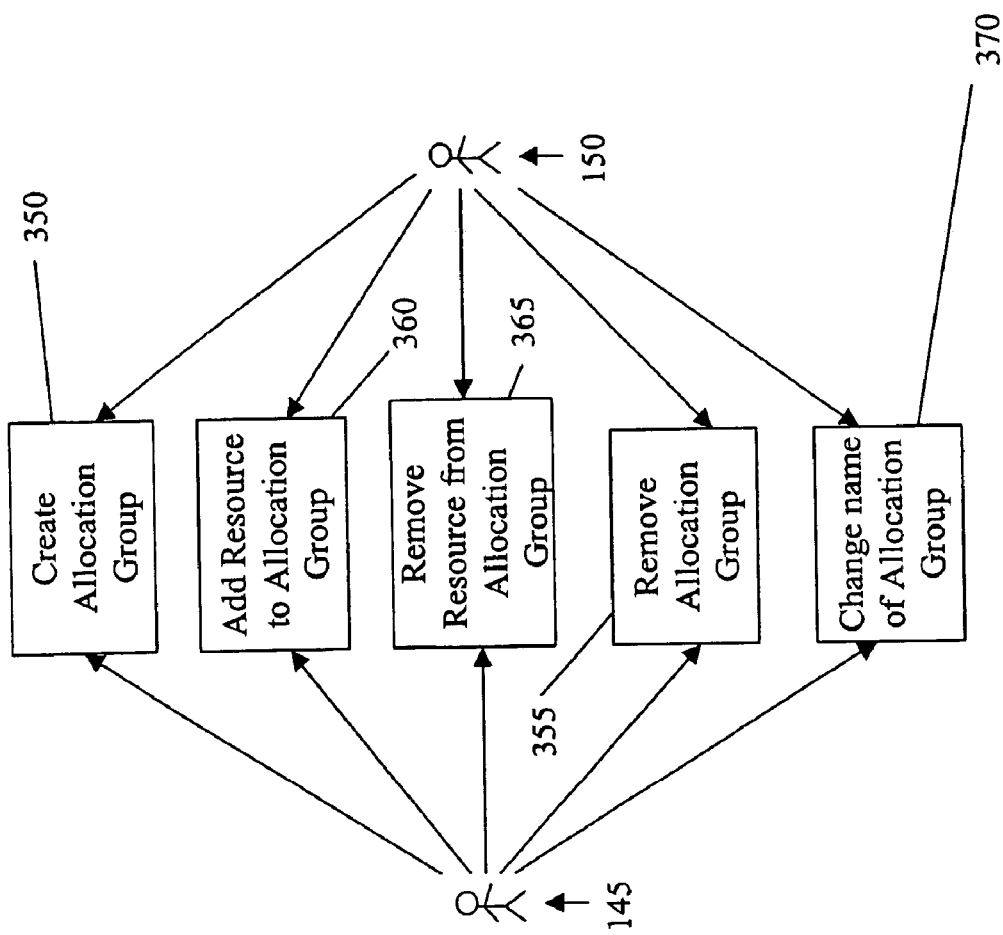
FIG. 10 is a block diagram showing one method in which a user can configure allocation groups in connection with the present invention.

As shown in FIG. 10, allocation groups can be created 350, removed 355 and modified (as at 360, 365 and 370) and can further incorporate users or resources. Allocation groups are groups of resources which are so grouped so as to restrict which instances of resources users of the system of the present invention are able to see and/or request. For example, if a series of workspaces are labeled the "Project Finance group spaces," creating a reservation for such series may be limited to those members of the Project Finance team. Both resources and users can be added and removed from allocation groups.

Thus, in one embodiment of the present invention, the entirety of system users may have access to a certain subset of system resources, a subset of system users may have access to separate system resources, and individual users may be provided with exclusive access to particular system resources. For example, a corporate vice president can have her workspace allocated specifically and only to her, thereby allowing her to reserve that workspace routinely as desired. The same vice president may be part of a group of users having the ability to reserve the corporate board room. Further, the vice president would be part of the universe of users capable of reserving a laptop computer, for example.

In those instances where a user's allocation have no available resources, a concierge user can make a reservation for that user employing the broader concierge's allocations.

It will be appreciated that appropriate business rules may be associated with the management of transactions, users, resources and system implementation. For example, if a user is not allowed to bump his or her own reservation, that is a business rule affecting the management of transactions. The present invention can be provided with its own set of modifiable business rules. In another embodiment, the present invention can be provided with no set business rules, whereby the administrator can establish all business rules affecting system management.

Kiosk Interface and Other Interfaces

Figure 11:
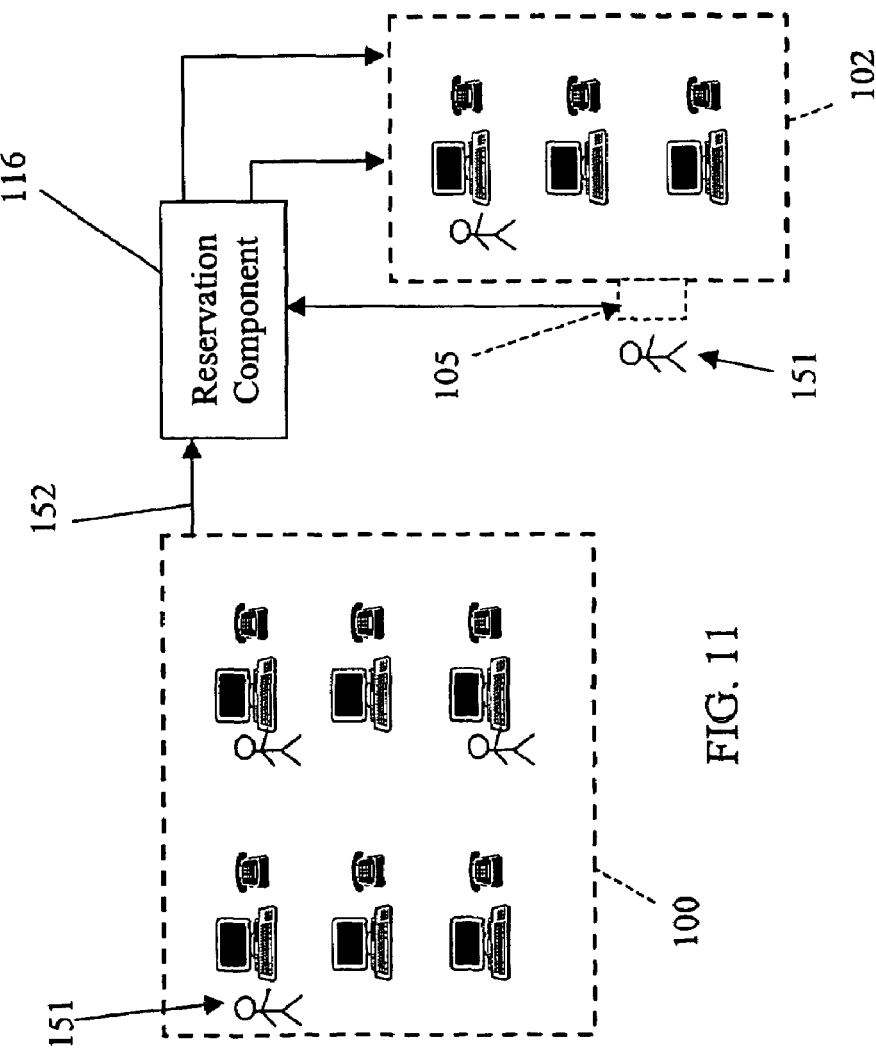
FIG. 11 is a diagram showing how a user may reserve and check into a reservation in accordance with one embodiment of the present invention.

In the physical layout of one embodiment of the system of the present invention, computers displaying the Kiosk Interface 105 can be placed locally at or near the entrance to a facility 102, as shown in FIG. 11. The system's Kiosk Interface allow users to quickly access frequently used system functions. For example, through a Kiosk Interface, a user may create a "just in time" reservation or a "one-click" reservation, check into or out of a reservation, cancel a reservation, or locate a resource, reservation, or person.

In a typical embodiment of the present invention, the Kiosk Interface of the system operates on a computer equipped with a touch screen monitor that allows the user to use touch-sensitive controls to enable system interaction and resource manipulation via fingertip. Because the Kiosk Interface is a browser-based interface, it may be deployed anywhere network connectivity exists. Touch screen interfaces are commonly known, but not deployable as a browser based interfaces. By the present invention, floor plans and other diagrams and icons representing system resources can be presented as bitmap, gif or other computer graphic images and used to make system function much easier to control and to provide a useful format to display database information to the user. Similar icons and graphical representations can be represented and manipulated on a wireless device interacting with the present invention.

As shown in FIG. 1, the system can be accessed through multiple interfaces over a variety of communication networks. For example, a user can access the system via a properly equipped wireless device 80 over a wireless network 82, via standard network computer 84 over the internal network, or via remote computer 86 over the Internet, an extranet or other public/private network 88. Service providers 90, vendors 92, communications providers 94 and other outside parties 96 can access the system in similar ways. For example, in one embodiment of the invention, outside parties could be allowed to rent excess workspace. Appropriate firewall and other security can be implemented to allow such outsiders to use standard business computing components.

In a further embodiment, users of separate systems can access resources of the other system. For example, an employee of Company A having a certain role and privileges for manipulating resources within Company A's management system, may be allowed to access Company B's management system in the role of an outside user. As such, the Company A employee may be able to reserve temporary workspace while on travel.

In one embodiment, the present invention accommodates such circumstances whether the outside user situation is private-to-private, private-to-public, public-to-private, or public-to-public. Further exemplifying, private-to-private access can occur with a user from a corporation at location A seeking to manipulate resources from location B. Private-to-public access can occur when user from Company A seeks to use public resources made available such as by a tele-work center. Public-to-private access can occur when the public user seeks to manipulate or reserve resources from Company A's private management system. Public-to-public access can occur when an unaffiliated user seeks to interact with resources generally available and not private.

Reporting

It will be appreciated that through the interaction of the many users of the system of the present invention, valuable data can be derived. The present invention can be provided with data management and reporting capabilities to address the information needs of the concierge, office managers, facility managers, business/line managers, database and system administrators, fulfillment agents, and senior executives. For example, reports may be provided for past system usage on a daily/weekly basis, or for future estimated system use. Reports may be customized based on user type, resource type, request type, reservation type, workflow, or type of device making the reservation, for example. Through report analysis, better business decisions can be made to ensure system up-time, utility and profitability.

In one embodiment of the invention, the system can use an on-line entry database having the more complex table structure for adding and modifying on-line data, coupled with a reporting database having a modified table structure designed to minimize table joins and maximize processing speed. Data archiving and historical transaction data collection can be achieved through methods presently known in the art.

FIG. 11 shows one embodiment of a method of the present invention whereby a user 151 from a first facility 100 interacts with the reservation component 116 of the present invention to reserve a conference room at a second facility 102. The user 151 is presumed to have been appropriately added to the user database and provided with appropriate authorization credentials and permissions.

Figure 12:
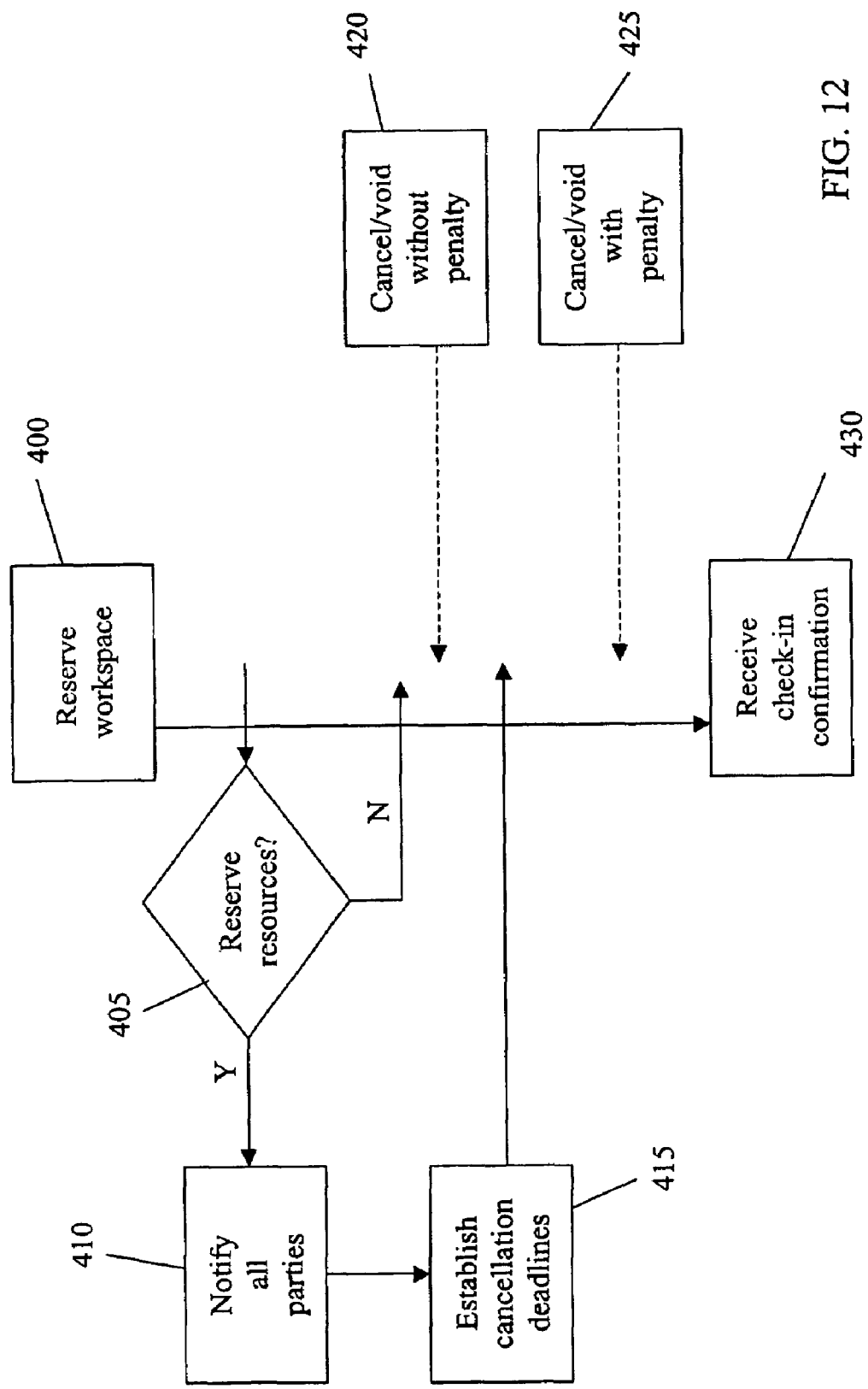
FIG. 12 is a flow chart showing the timing of certain events in connection with a reservation and check in, in one embodiment of the present invention.

As shown in FIG. 12, once the user has reserved the workspace (at 400), he or she is prompted to reserve additional resources, as at 405. If, for example, the user has requested catering for eight people, network connectivity, a VCR, a television and voice service, several outside parties may be notified in advance of the user's reservation, as at 410. At 415, cancellation deadlines may be established whereby the user will be held financially responsible if attempting to cancel an order or service beyond the deadline, as at 425. If the user cancels the reservation for the order or service prior to the deadline, there is no penalty, as at 420. Once the user checks in at 430, resources which need no advance set up can be transferred to the user's workspace. For example, if a network or voice connection needs to be flipped, this can take place nearly instantaneously with the user's check in.

Referring back to FIG. 11, the user 151 may check in at a kiosk 105 provided at the facility 102 where his workspace is reserved. In one embodiment of the invention, the kiosk 105 can be provided at one building of a combination of buildings. In this "campus" mode, the user can check in at the kiosk provided at a first building for a reservation at a second building within the same group of buildings. This is highly desirable for companies employing a campus-like work environment.

Figure 13:
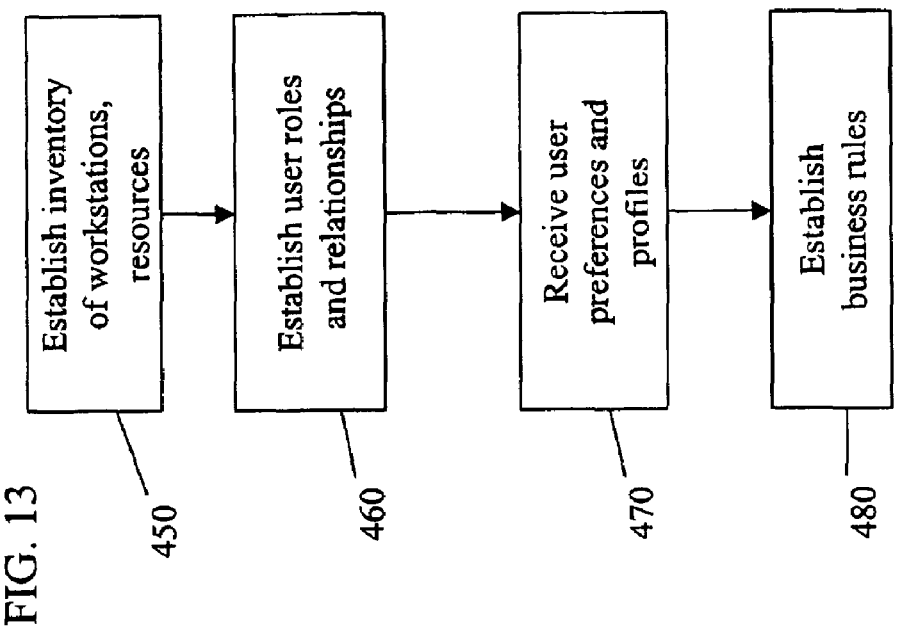
FIG. 13 is a flow chart showing how the system of the present invention may be implemented.

As shown in FIG. 13, system implementation involves establishing the inventory of workspaces and resources as at 450, as well as the user roles and relationships 460. Once the fundamental players are defined, customized features can be provided such as user preferences and profiles 470 and specific business rules 480.

Figure 14:
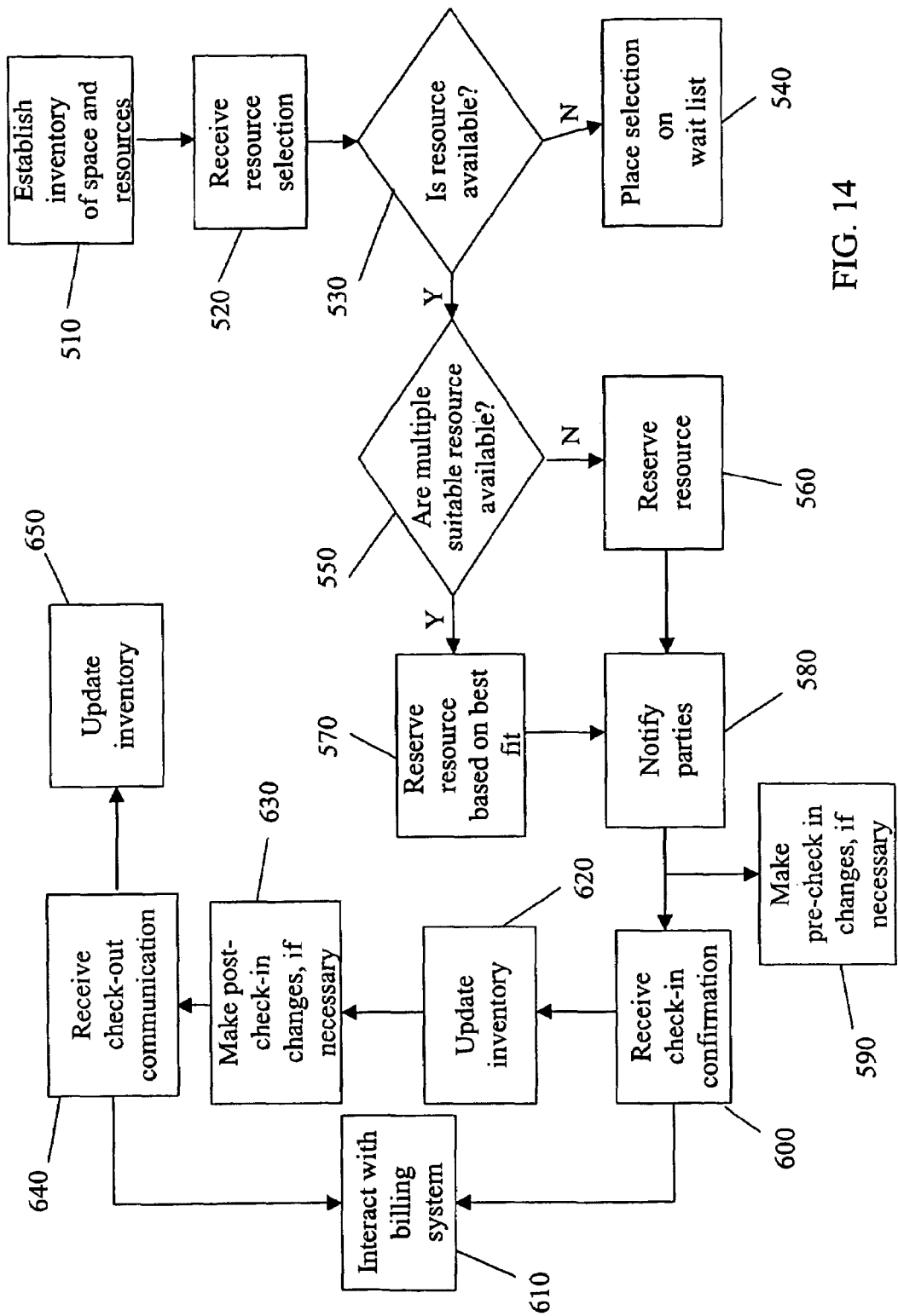
FIG. 14 is a flow chart showing system operation in accordance with one embodiment of the present invention.

FIG. 14 is a flow diagram showing system interaction among the various components during a reservation sequence. As at 510, the inventory of resources is established. At 520, a previously registered user may select for a reservation any resource in his or her allocation. The system checks its inventory of resources at the requested facility to determine if a resource is available, as at 530. If not, then the system can notify the requesting user and the requesting user can try a different search. Alternatively, the system can put the user's resource selection in a wait-list for a resource at the requested facility, as at 540. The resource can be waitlisted automatically or after being directed by the user, if resource is configure to allowed that resource to be waitlisted.

The system determines if multiple resources will exactly satisfy the user's selection criteria, as at 550. The user then selects the specific resource desired. If there is no exact match for the resource selection criteria, the system will perform a "best fit" search as at 570. Best fit can be determined by giving the requesting user a choice among several resources that best fit the user's specific resource criteria. The user then can select the specific resource desired.

Once the reservation is made, appropriate parties are notified as at 580 and the system inventory is updated to reflect the now-taken resources for the given time and date. For example, any attending users, support staff, service suppliers and other parties can be notified via e-mail or other communications method deemed appropriate. Before checking in, the user can request changes as at 590 to resources or space as long as the user has been given authorization. Once the user has checked in to the reservation as at 600, the billing component may be notified as at 610 to track the user's occupancy and other potential charges for resources. It will be appreciated that, while the billing component may be most frequently tied to check in and check out, the billing component may interact with the reservation system on more occasions.

Once the user has checked in, the inventory of space and resources can be updated as at 620 to reflect at least the user's current releasing of his previously occupied space, which may be his default workspace. If the user then requires post check-in changes to resources, he may request them to the extent allowed as at 630. Upon check out at 640, the billing component may again be notified, and the system inventory is updated as at 650 to reflect the change in occupancy status of the resource which had been checked into and the resource to which the user next goes.

Voice Communication Controller

Figure 15:
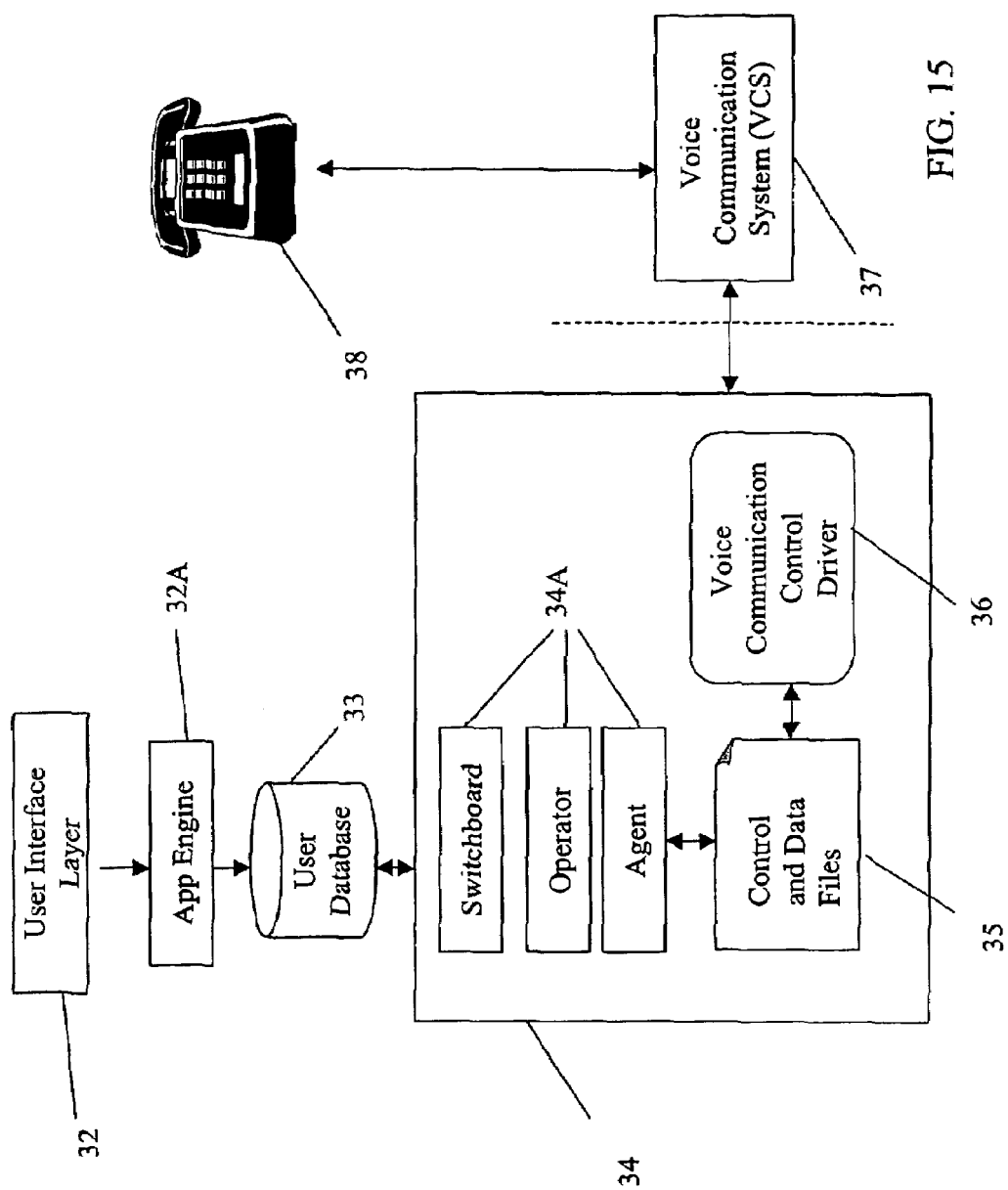
FIG. 15 shows a flow diagram illustrating voice communication control methods in accordance with the present invention.
Figure 16:
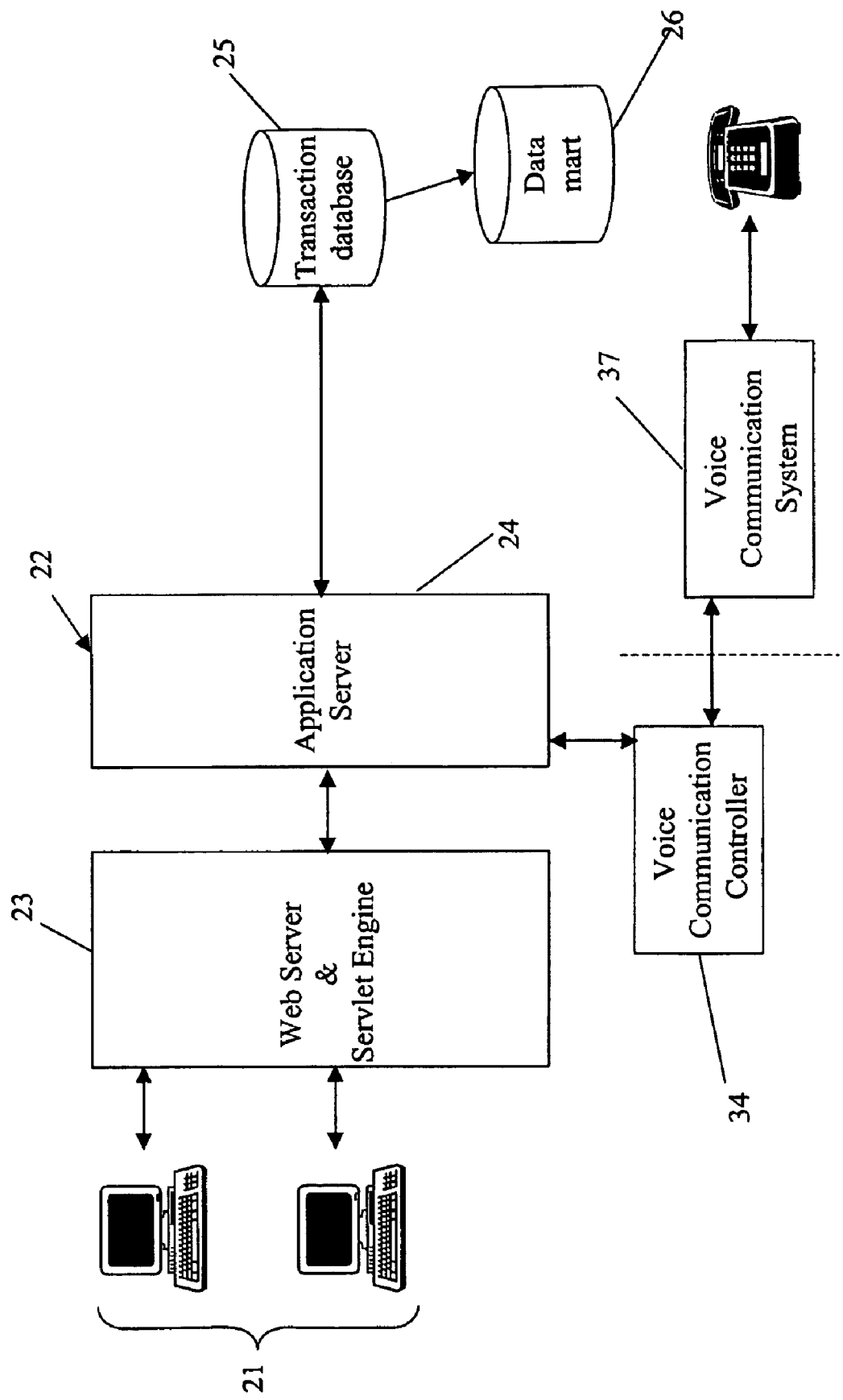
FIG. 16 is a diagram of the system architecture in accordance with one embodiment of the present invention.

As shown in FIGS. 15 and 16, the present invention can be configured to handle voice communication services as well as data. For example, a user moving from his or her default workspace to workspace in the same or another facility will find it most convenient if their voice services are transferred to the local device at the facility where they will be located. In this way, their voice profile, telephony functions such as voice mail and other customized phone attributes can be transferred to their new location for the duration of their visit. In one embodiment, as shown in FIG. 15, the user makes a reservation through a system interface 32, which collects their voice communication profile information from the database 33 using application engine 32A, and notifies the voice communication controller 34. The voice communication controller can comprise a switchboard, operator and/or agent 34A, control and data files 35 and a voice communication control driver 36. The voice communication controller 34 passes control and data files 35 to the voice communication control driver 36 for binding or removing the user profile to or from the physical device 38 where the user will be located, via the voice communication system 37.

In the present invention, the switchboard, operator and/or agent 34A along with the control and data files 35 transport appropriate data between the system database and the voice communication control driver 36. The driver 36 continuously loops through the process of checking for a voice communication controller termination flag, which signals a request from the voice communication controller for the driver application to terminate. Within this loop, another loop can execute to check for the voice communication controller start flag, which signifies that there is task data in the task file containing commands. When the driver 36 detects a start flag, the interface will transmit user and device information, as well as commands that instruct the call manager to log a specific user into or out of a specific device. When signaled by the driver, the interface will pass a completion flag with success or failure codes and, if applicable, error codes and specific messages from the call manager back to the voice communication controller 34. Data transmission between the voice communication controller and the driver can be performed using a task file API (application programming interface). Control flow between the voice communication controller and the driver can be negotiated using a signal file API.

Upon receipt of a login or logout command from the driver 36, the voice communication system interface can translate the task data from the task API into XML that conforms to the login service document type definition (DTD) supplied by the voice communication system (e.g., Cisco™ Call Manager™). The voice communication system interface can be made specific to the login request and login response DTDs for the current login service version. In one embodiment, the driver 36 sends the resulting XML to the login service active server page (ASP) via HTTP POST, and the interface then waits for the response from the voice communication system. Upon receipt of a login/logout response from the login service, the driver can translate the XML data into voice communication controller task data, which can then be passed from the voice communication system interface to the driver 36 for flow control and error handling. All transmissions to and from the voice communication system interface to the voice communication system can include authentication data for the driver itself 36, as well as the user and device data required for the given situation. Further, the voice communication system interface need not use the login service query functionality provided by the commercial manufacturer of the voice communication system.

The provisions in the system of the present invention for interacting with the voice communication system ensure a cohesive solution for businesses. For example, the system of the present invention can be used to initiate and terminate voice communication profile transfer to a given phone extension for a given workspace in several different ways. In one example, the user can specify when the system should transfer his or her voice communication profile. In another example, the system of the present invention can enable the transfer to occur automatically at a certain time each day. In one embodiment of the invention, the system will be given a "sweep time" in which to "sweep" all temporarily transferred voice communication profiles from the given extensions. In a further example, the system can establish a start time and a complete time for the user's reservation and automatically transfer the user's voice communication profile at the start and complete times. In still a further example, the system can establish a buffer time period, which gives the user time to "check in" to his or her reservation past the reserved start time. If the user checks in prior to the expiration of the buffer time period, the system would then leave the voice communication profile at the reserved extension; otherwise, the system could terminate the profile from the given extension. In another example, the system of the present invention can delay the transfer of the voice communication profile from a given extension automatically at the end of the last day of a multiple day reservation. In another example, the system of the present invention can transfer the voice communication profile from a given extension automatically when the user employs the Check Out command.

Integration with Other Services

In one embodiment of the invention, the system can be integrated with third party packages. For example, the system can be integrated with e-mail and ICS (Internet Calendaring Standards) supported applications, such as Lotus Notes™ commercially available from IBM Corporation and Exchange™ from Microsoft Corporation. The present invention can further be integrated with HR System programs, such as Peoplesoft™, commercially available from Peoplesoft, Inc. The present invention can utilize standard XML and ODBC technologies and therefore is capable of integrating with space recharge systems, visitor management systems, security systems, and finance systems, catering, facility management, air/car/hotel, video services such as video collaboration and video conferencing, as well as leading telephony switches such as those commercially offered by Cisco Systems, Avaya, Nortel, Siemens, Comdial, Bosch, Lexicom and others.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A method for facilitating user portability in a work environment comprising the steps of:
providing an inventory of resources including a plurality of shared physical resources and corresponding voice communication extensions available to be searched for and reserved,
establishing a voice communication profile for at least one user and associating the voice communication profile with a first physical workspace resource and corresponding voice communication extension, and removing said first physical workspace resource from being a resource available for reservation;
receiving an electronic request from said user or a person acting on behalf of said user to reserve a second physical workspaces resourse for said user for a given time period to the exclusion of any other user during the given time period;

at a determined beginning time not associated with the receipt of an incoming call, binding the voice communication profile to said second workspace resource while disassociating the voice communication profile from the first workspace resource, thereby allowing said first workspace resource to be available for reservation, and whereby incoming voice traffic intended for said user is received exclusively at the second resource's extension between the determined beginning time and the determined end time; and at a determined end time not associated with the termination of a call, disassociating said voice communication profile from said second workspace resource.

2. The method of claim 1 wherein said given time period includes a start and a complete time and wherein said determined beginning time is said start time.

3. The method of claim 2 including the step of establishing a buffer time period and further establishing said determined end time to be equal to the buffer time added to the start time, provided that no check-in communication is received from said user before said buffer time period has elapsed.

4. The method of claim 1 including the further step of receiving a check-in communication from said user and wherein said determined beginning time is determined by said check-in communication.

5. The method of claim 1 wherein said given time period includes a start and a complete time and wherein said determined end time is said complete time.

6. The method of claim 1 including the further step of receiving a check-out communication from said user and wherein said determined end time is determined by said check-out communication.

7. The method of claim 1 including the step of establishing an end-of-day sweep time and wherein said determined end time is said sweep time.

8. The method of claim 1 wherein said binding takes place using Voice-over-IP (VOIP).

9. A telephony system, comprising:

an inventory component for storing and accessing information about at least shared workspace resources;

a user component for storing and accessing information about system users, including a voice communication profile and a first physical workspace resource for at least one user;

a reservation component for allowing users to electronically interact with said inventory component to at least reserve a second physical workspace resource to the exclusion of any other user during a given time period; and a voice communication controller for controlling the binding of said at least one voice communication profile to and from at least one resource, said controller including means for disassociating the user's voice communication profile from the first workspace resource and means for binding the voice communication profile to the second workspace resource such that incoming voice traffic intended for said user is received exclusively at the second resource's extension between a determined beginning time and a determined end time associated with the reserved second resource.

10. The system of claim 9 wherein said voice communication controller operates via said reservation component.

* * * * *